(12) United States Patent
Shimazaki

(10) Patent No.: US 7,181,006 B2
(45) Date of Patent: Feb. 20, 2007

(54) PORTABLE TERMINAL DEVICE HAVING TIMER

(75) Inventor: Mamoru Shimazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 386 days.

(21) Appl. No.: 10/338,838

(22) Filed: Jan. 9, 2003

(65) Prior Publication Data

US 2003/0128839 A1 Jul. 10, 2003

(30) Foreign Application Priority Data

Jan. 10, 2002 (JP) .............................. 2002-003729

(51) Int. Cl.
  *H04M 1/00* (2006.01)
(52) U.S. Cl. ............................ 379/433.01; 379/433.04; 379/433.12; 379/433.13; 455/556.2; 455/575.1; 455/90.3; 345/211; 345/212; 345/213
(58) Field of Classification Search ........... 379/433.01, 379/433.04, 433.12, 433.13; 455/556.2, 455/575.1, 90.3; 345/173, 211, 212, 213; 363/21.01
See application file for complete search history.

(56) References Cited

U.S. PATENT DOCUMENTS

| | | | | |
|---|---|---|---|---|
| 5,375,245 A | * | 12/1994 | Solhjell et al. ............. | 713/320 |
| 5,623,286 A | * | 4/1997 | Morimoto et al. ........... | 345/212 |
| 5,841,431 A | * | 11/1998 | Simmers ..................... | 345/211 |
| 6,430,062 B1 | * | 8/2002 | Shin .......................... | 363/21.01 |
| 6,542,721 B2 | * | 4/2003 | Boesen ..................... | 455/556.2 |
| 6,636,203 B1 | * | 10/2003 | Wong et al. ................ | 345/173 |

FOREIGN PATENT DOCUMENTS

| | | |
|---|---|---|
| CN | 1235489 A | 11/1999 |
| GB | 2325821 A | 12/1998 |
| WO | WO 98/21709 * | 5/1998 |
| WO | WO 01/95596 A1 | 1/2001 |

* cited by examiner

*Primary Examiner*—Quynh H. Nguyen
(74) *Attorney, Agent, or Firm*—McGinn IP Law Group, PLLC

(57) ABSTRACT

A portable terminal device has a timer directly transmitting a signal to a displaying circuit. The displaying circuit directly receives the signal from the timer at set time intervals to update time display of a display part. The control part of the portable terminal device need not be started to update the time display. The battery consumption of the portable terminal device can be reduced. The time display can be updated when the portable terminal device is in a power conservation state.

23 Claims, 22 Drawing Sheets

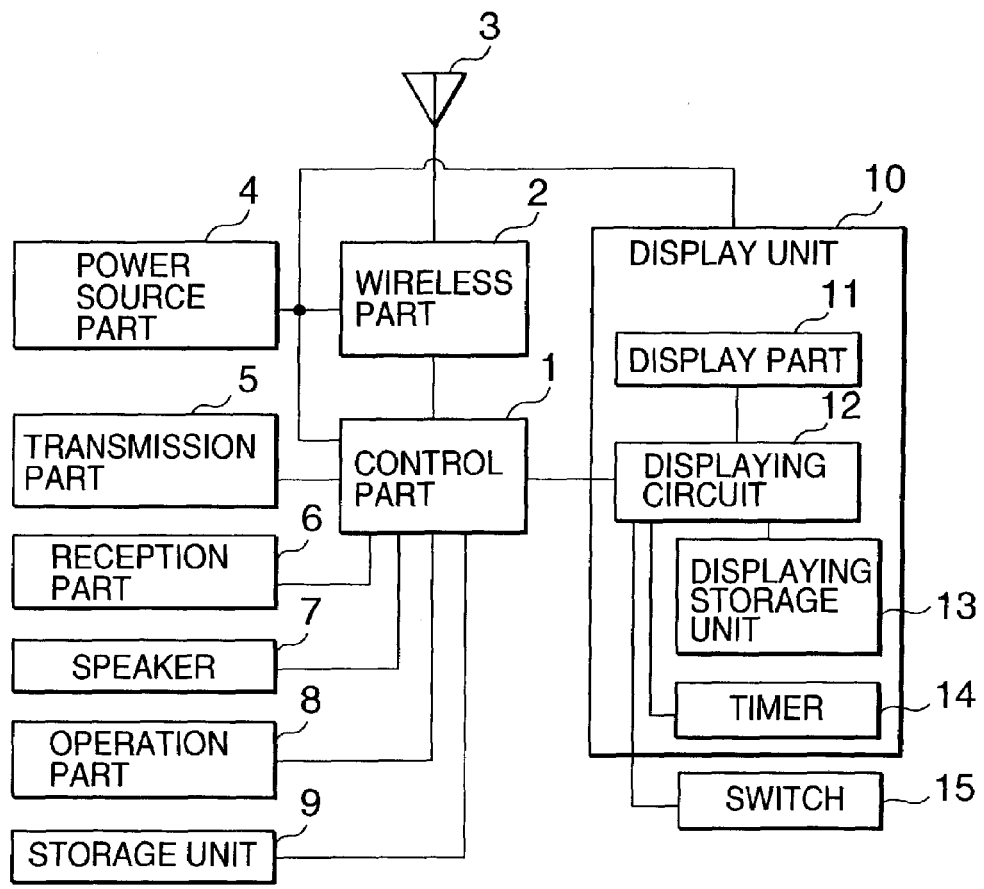
FIG. 7
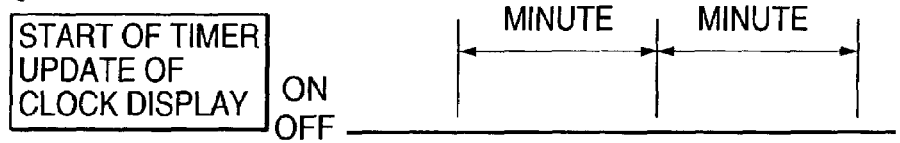
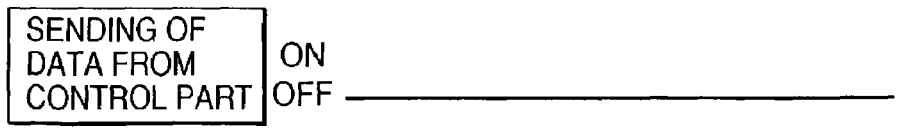

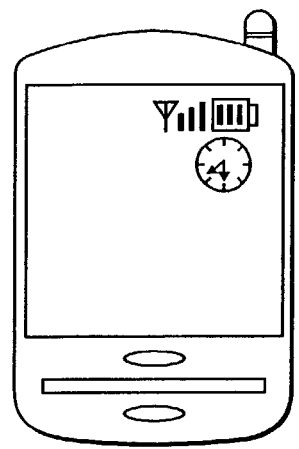 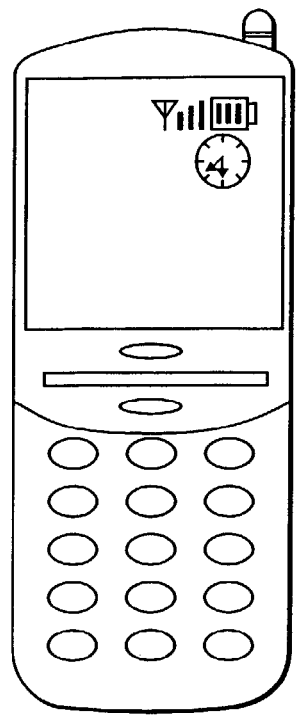
FIG.26A   FIG.26B
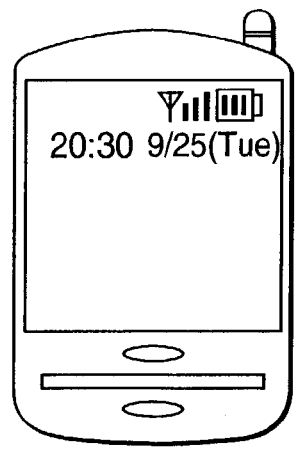 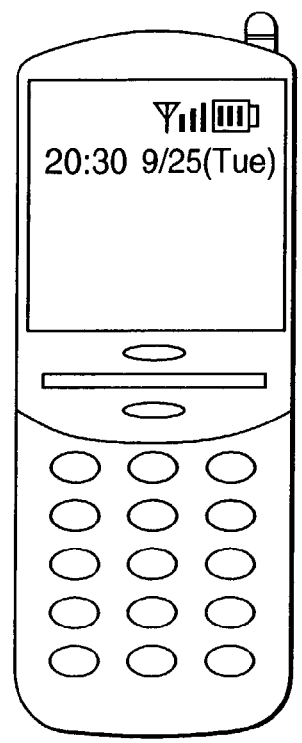
FIG.27A   FIG.27B

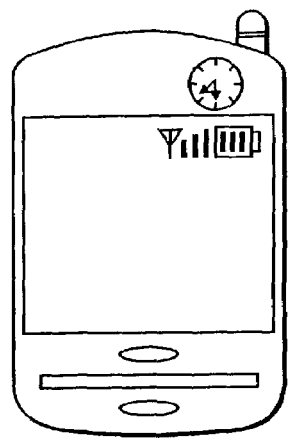 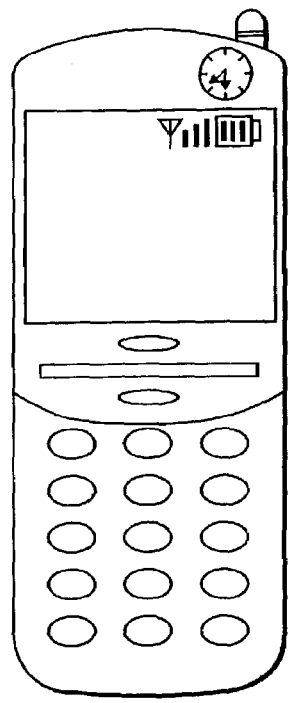
FIG.28A  FIG.28B
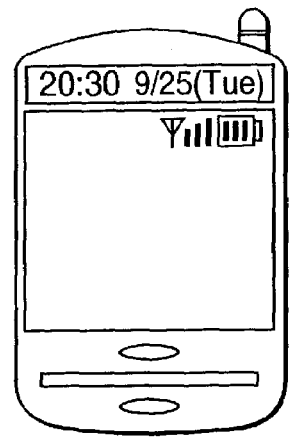 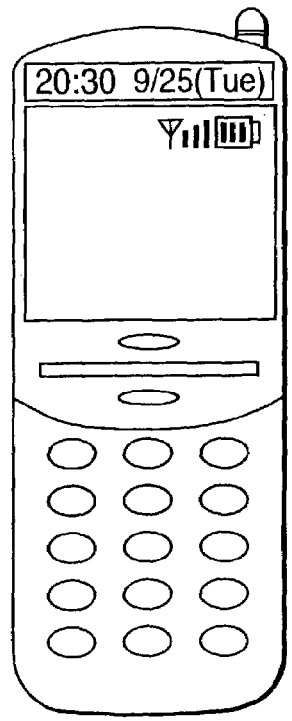
FIG.29A  FIG.29B

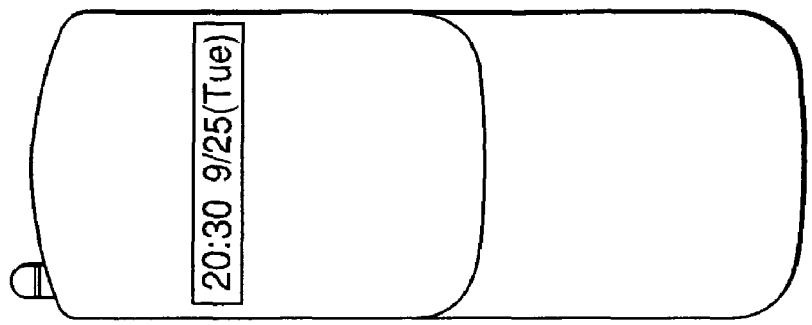
FIG.31A  FIG.31B
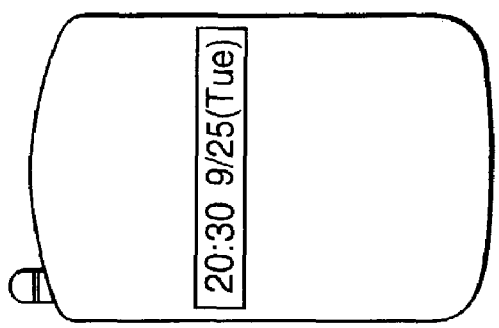
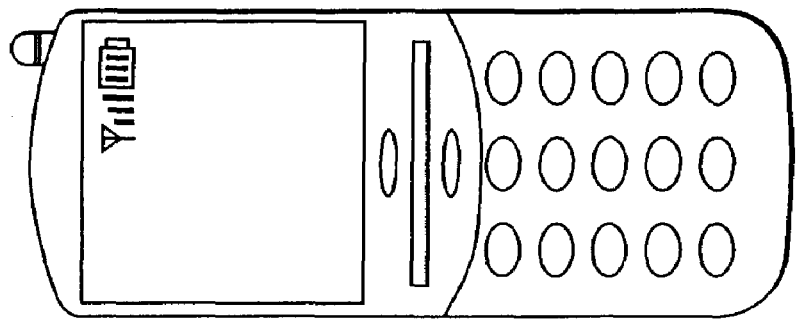
FIG.31C  FIG.31D
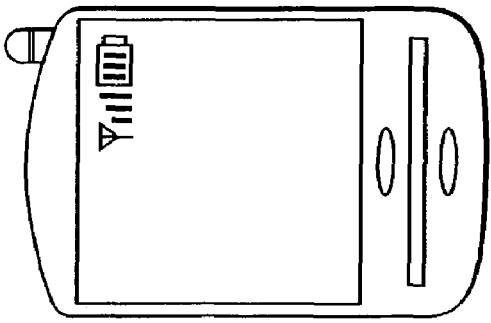

PORTABLE TERMINAL DEVICE HAVING TIMER

BACKGROUND OF THE INVENTION

1. Field of the Invention

The present invention relates to a portable terminal device. More specifically, the present invention relates to a portable terminal device having a timer.

2. Description of the Related Prior Art

As shown in FIG. 1, a portable phone generally has a control part 1, a wireless part 2 and a display unit 10. The control part 1 is connected to a transmission part 5, a reception part 6, a speaker 7, an operation part 8, a storage unit 9 and a timer 14. The wireless part 2 is connected to an antenna part 3. The display unit 10 has a display part 11 displaying various information and a displaying circuit 12 and is connected to the control part 1. A power source part 4 is connected to the control part 1 and the wireless part 2 and supplies power.

When such portable phone updates displayed data, the control part 1 reads the displayed data from the storage unit 9 and sends the data to the displaying circuit 12. In order that the portable phone updates clock display at fixed time intervals, the control part 1 must be operated at the fixed time intervals. The battery is consumed each time the operation is performed. FIGS. 2A, 2B and 2C show an example of the data send timing of the control part of the prior art portable phone. In this example, the timer 14 is started every one minute, and then, the control part 1 updates the time display of the display part 11 (FIG. 2A). During this, the control part 1 may update information showing the current state (for example, the amount of battery remaining and reception level display) of the portable phone (FIG. 2B). In the prior art portable phone, each time the information displayed on the display part 11 is updated, the control part 1 is operated to consume the battery (FIG. 2C).

SUMMARY OF THE INVENTION

An object of the present invention is to provide a portable terminal device which can reduce consumption of a battery required to update displayed information.

To achieve the object, a portable terminal device of the present invention has a display part displaying information; a timer measuring time; a storage part storing information displayed on the display part; a displaying circuit directly detecting a signal from the timer and displaying time on the display part; and a control part controlling display of information showing the current state of the portable terminal device.

In the portable terminal device of a specific example of the present invention, the power source part of the portable terminal device can directly supply power to the display part, the timer, the storage part and the displaying circuit. The display part can be set to a non-display state. The portable terminal device can have a switch part displaying information on the display part when the display part is in the non-display state. The terminal can also have a first display part displaying information showing the current state of the terminal and a second display part displaying time.

BRIEF DESCRIPTION OF THE DRAWINGS

The above and other objects, features and advantages of the present invention will become apparent from the following detailed description when taken with the accompanying drawings in which:

FIG. 7 is a block diagram showing another specific example of a portable terminal device of the present invention;

FIGS. 8A, 8B and 8C show an example of the displayed data update timing of the portable terminal device of the present invention;

FIGS. 26A and 26B show an appearance diagram of another specific example of a portable terminal device of the present invention;

FIGS. 27A and 27B show an appearance diagram of another specific example of a portable terminal device of the present invention;

FIGS. 28A and 28B show an appearance diagram of another specific example of a portable terminal device of the present invention;

FIGS. 29A and 29B show an appearance diagram of another specific example of a portable terminal device of the present invention;

FIGS. 31A, 31B, 31C and 31D show an appearance diagram of another specific example of a portable terminal device of the present invention;

DETAILED DESCRIPTION OF THE PREFERRED EMBODIMENTS

Figure 1:
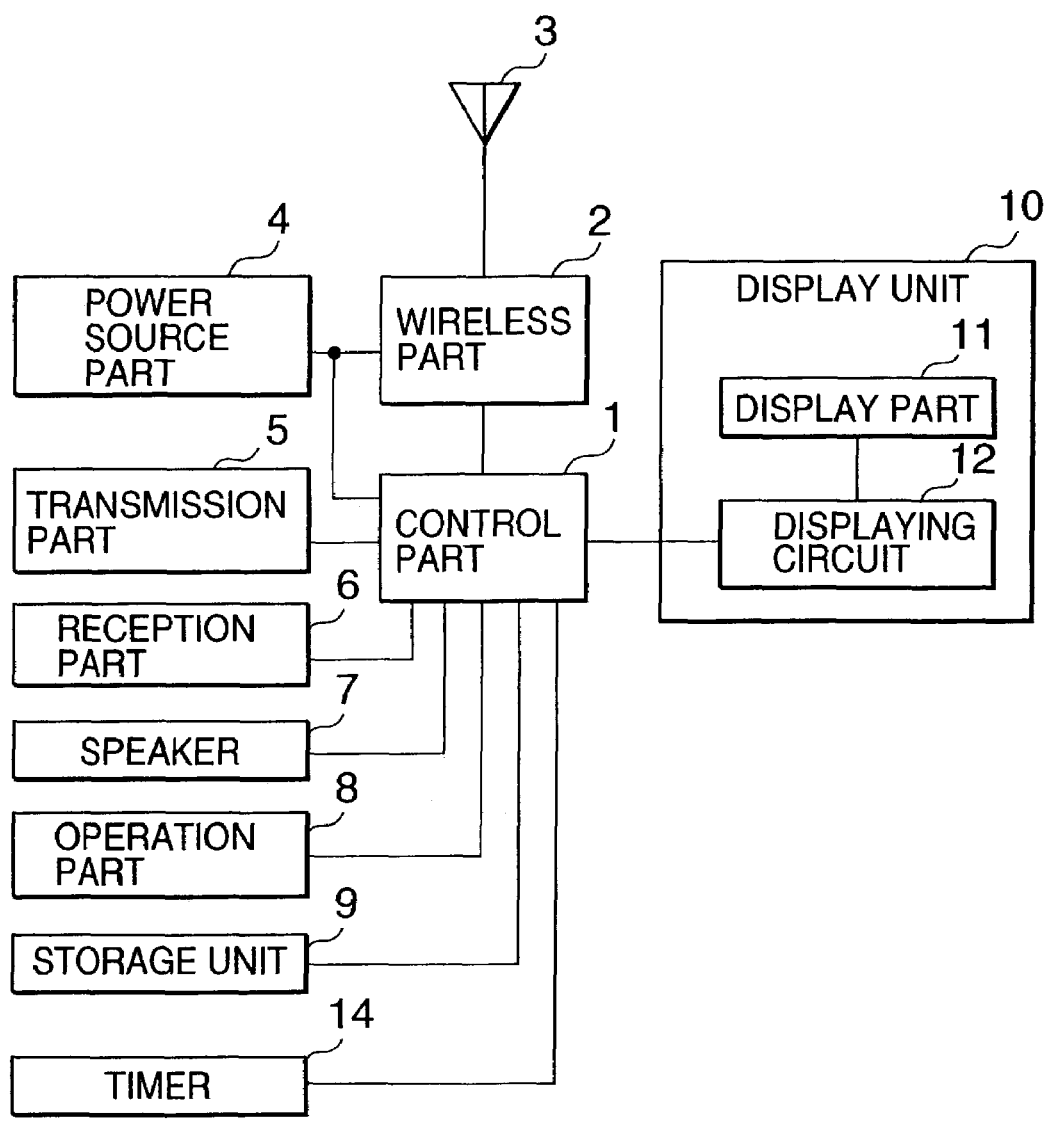
FIG. 1 is a block diagram showing a specific example of a prior art portable phone.
Figure 2:
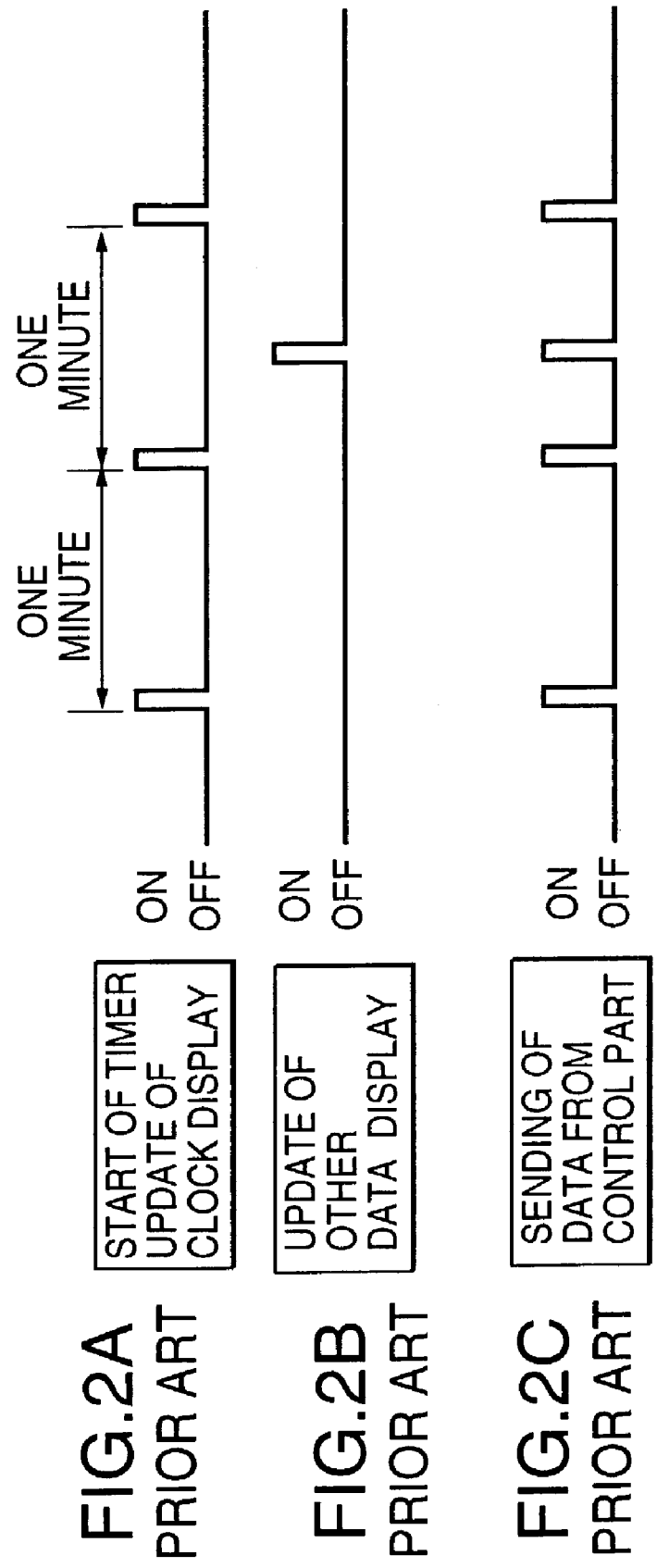
FIGS. 2A, 2B and 2C show an example of the data send timing of a control part of the portable phone.
Figure 3:
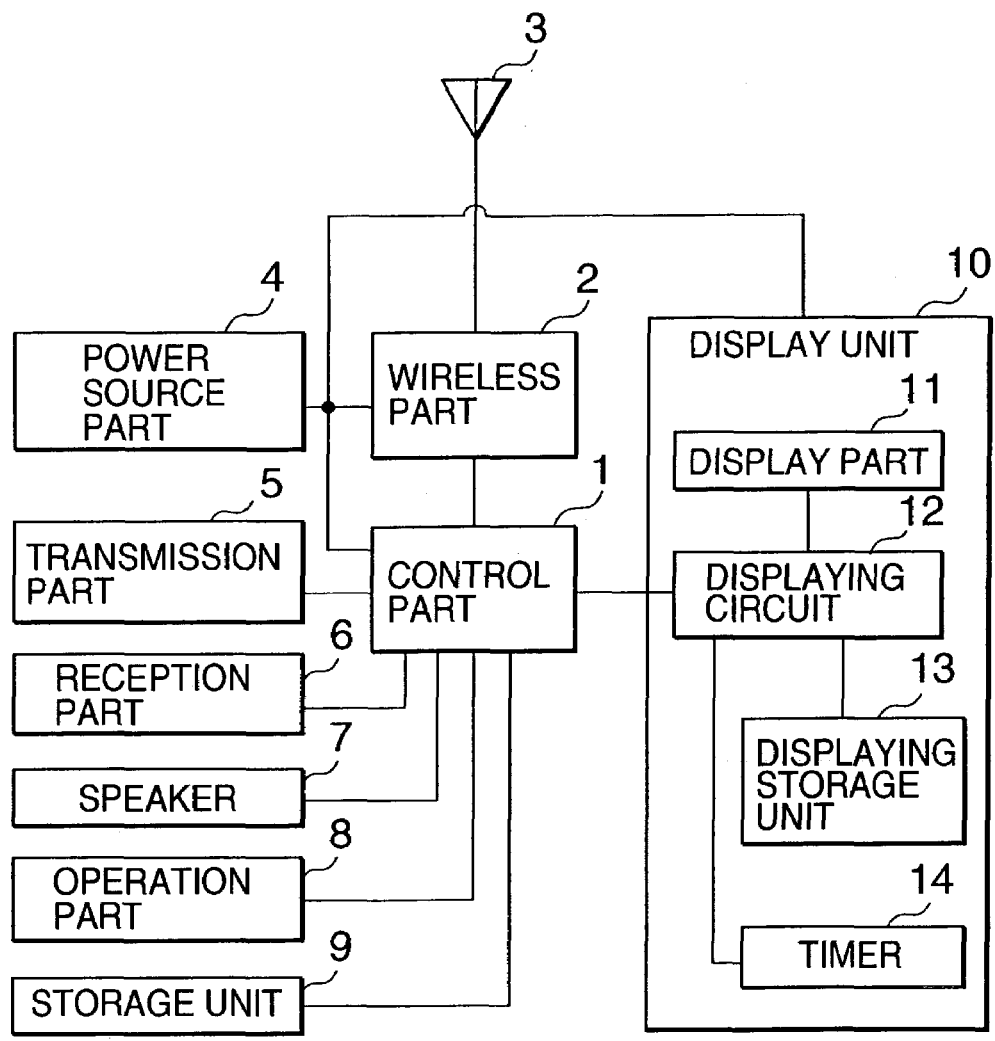
FIG. 3 is a block diagram showing a specific example of a portable terminal device of the present invention.

Referring to FIG. 3, a portable terminal device of a specific example of the present invention has a control part 1 and a wireless part 2. Data is transmitted and received between the control part 1 and the wireless part 2. The wireless part 2 has an antenna part 3. The control part 1 is connected to a transmission part 5 transmitting a voice signal of a user to the party on the other end, a reception part 6 transmitting a voice signal of the party on the other end to the user, a speaker 7 notifying music and an alarm sound to the user, an operation part 8 performing transmission/reception and various functions, a storage unit 9 storing the current state and data of the portable terminal device and a display unit 10 and controls the portable terminal device. The display unit 10 is connected directly to a power source part 4. The display unit 10 has a display part 11 displaying various information, a displaying circuit 12 supplying a necessary signal to the display part 11, a displaying storage unit 13 storing data outputted to the display part 11, and a timer 14 measuring time, date and the day of the week. The display part 11, the displaying storage unit 13 and the timer 14 are all connected to the displaying circuit 12. At a predetermined time, the timer 14 sends a signal to the displaying circuit 12. The displaying circuit 12 receives the signal, reads data required for display from the displaying storage unit 13, and sends the signal to the display part 11 to update the contents of the time display of the display part 11. The display unit 10 has all units required to update the time display. It is unnecessary to acquire a timer signal and displayed data from the control part 1. The display unit 10 can update the time display when power is not supplied to the control part 1. The display unit 10 can update the time display likewise when the control part 1 is in a power conservation state. The portable terminal device can reduce battery consumption.

Figure 4A:
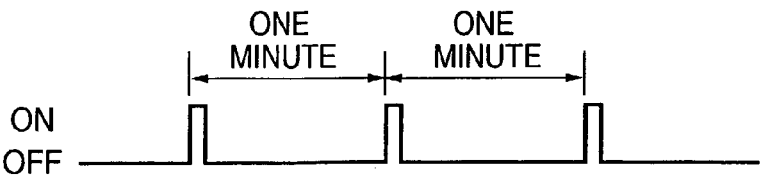
FIGS. 4A, 4B and 4C show the displayed data update timing of the portable terminal device of the present invention.
Figure 4B:
Figure 4C:

Referring to FIGS. 4A, 4B and 4C, there is shown an example of the displayed data update timing of the portable terminal device. The timer 14 directly sends a signal to the displaying circuit 12 every one minute. The displaying circuit 12 updates the time display of the display part based on the signal (FIG. 4A). To update the time display, the control part 1 is not started. When updating the current state (the amount of battery remaining and reception level) of the portable terminal device, the control part 1 is started to send the data to the displaying circuit 12 (FIG. 4B). In this example, the display part is updated four times for about two minutes. The control part 1 is started only once to send the data (FIG. 4C). The timer 14 can be set to be started every one second. The time update of the portable terminal device is typically performed every one minute.

Figure 5A:
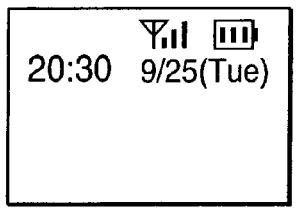
FIGS. 5A, 5B, 5C and 5D show an example of information displayed on the portable terminal device of the present invention.
Figure 5B:
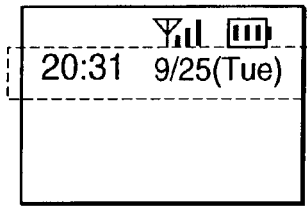
Figure 5C:
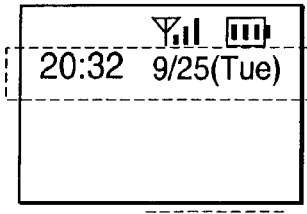
Figure 5D:
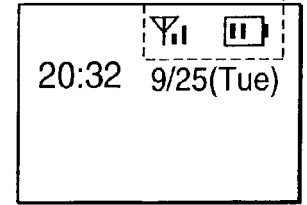

FIGS. 5A, 5B, 5C and 5D show an example of information displayed on the display part of the portable terminal device. The part surrounded by the dotted line in the drawing indicates the display update part. In this example, time 20: 30 (FIG. 5A) is updated to time 20: 31 (FIG. 5B). Based on the signal from the timer 14, the displaying circuit 12 updates the display part. When update of the time 20: 31 to time 20: 32 (FIG. 5C) is displayed, the same operation is performed. When updating display of the amount of battery remaining and reception level display, the screen display shown in FIG. 5C is updated to the screen display shown in FIG. 5D. In the case of the update, the control part 1 is started to send data to the displaying circuit 12.

Figure 6:
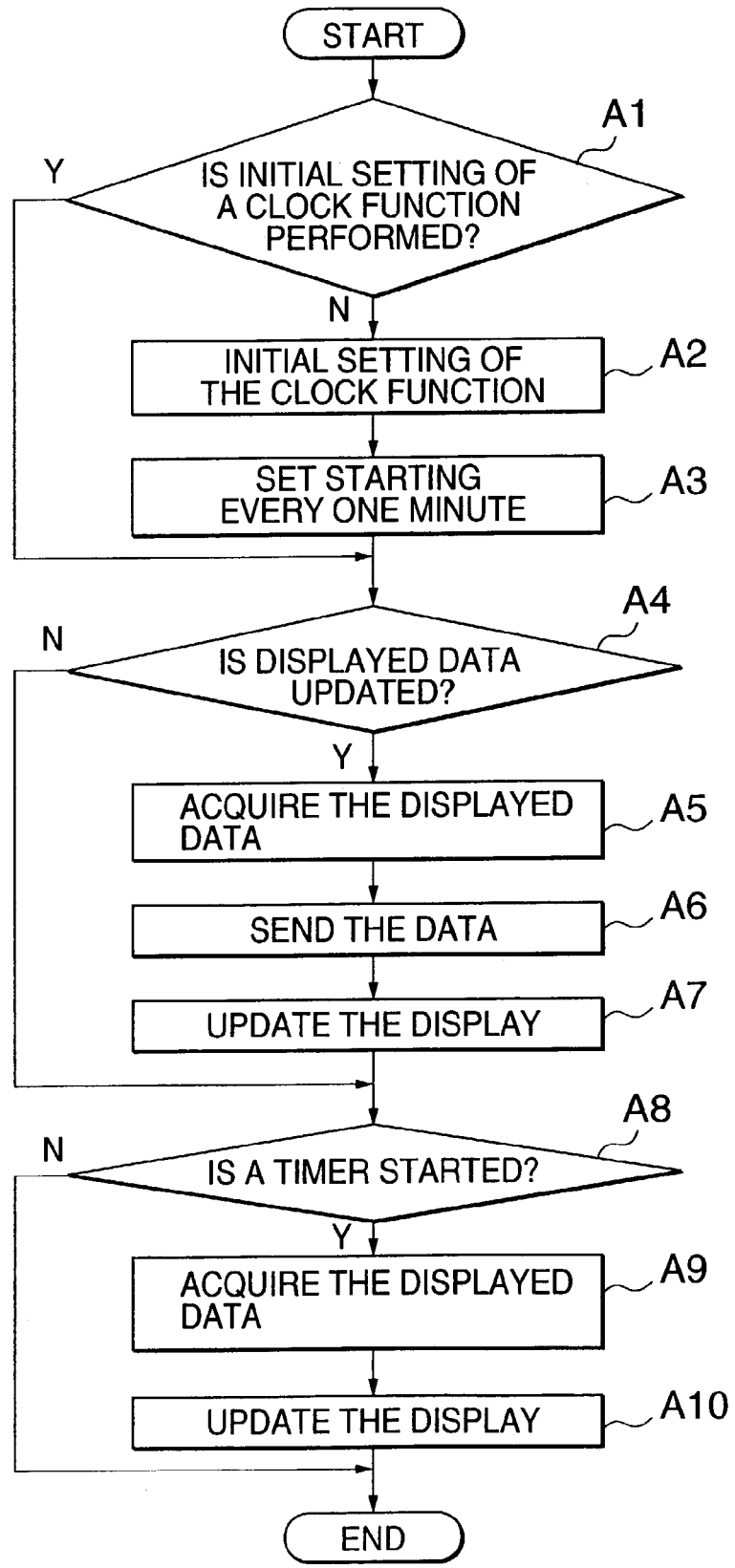
FIG. 6 is a flowchart showing an operation example of the portable terminal device of the present invention.

Referring to FIG. 6, there is shown a flowchart of the above operation example. The user of the portable terminal device checks whether initial setting of time display is performed or not (A1). When the initial setting has not been completed, the user sets various necessary data (A2) and sets the timer 14 to be started every one minute (A3). When the initial setting has been completed, the above procedure is unnecessary. After the initial setting, when the user sets the portable terminal device to a standby state, the control part 1 judges whether there is updated data to be sent or not (A4). When there is data which must be updated, the control part 1 reads the data from the storage unit 9 (A5) to send it to the displaying circuit 12 (A6). Based on the received data, the displaying circuit 12 updates the displayed data of the display part 11 (A7). When there is no updated data (A4), the above operation is not performed. Whether the timer 14 outputs a signal showing the elapse of the set time or not is judged (A8). When the displaying circuit 12 detects the signal from the timer, it reads the displayed data from the displaying storage unit 13 (A9) to update the time display of the display part 11 (A10). As described above, the operation of the steps A8 to A10 is executed to be independent from the control part 1. Unless the timer 14 outputs the signal, the above operation is not performed. The initially set portable terminal device repeatedly executes the operation of the steps A4 to A10 in a period of short time.

Referring to FIG. 7, a portable terminal device of another specific example of the present invention has a switch 15 connected to the displaying circuit 12. The switch 15 can be arranged in the operation part 8. Otherwise, the switch 15 can be arranged to be separated from the operation part 8. Only the display part 11 is in a display state, the time display is updated. When the display part is in a non-display state and a preset time elapses, the time display is not updated. When the display unit 10 is in a power conservation state, that is, the display part 11 is in the non-display state, the user can operate the switch 15 to display information on the display part. A fold type portable terminal device is brought to the non-display state when it is folded. When it is unfolded, the switch 15 is turned on. When the user does not perform the operation for a fixed time, the display part 11 can be brought to the non-display state. The control part 1 of the portable terminal device can be also in the power conservation state. Change of the display part into the non-display state is performed to be independent from the operation of the control part 1. When the power of the portable terminal device is off, the operation of the switch 15 cannot display information on the display part 11. In the non-display state, when the amount of battery remaining and reception level are changed, the display update is not performed. When time is displayed by the switch 15, the amount of battery remaining and reception level immediately before the non-display state can be displayed together.

Referring to FIGS. 8A, 8B and 8C, there is shown an example of the displayed data update timing of the portable terminal device when the display part 11 is in the non-display state. As shown in FIG. 8A, in the non-display state, the timer is not started every one minute and the time display is not updated. In the non-display state, only when the switch is operated, the display update is performed. When the switch 15 is operated, the displaying circuit 12 identifies a signal from the switch 15 to acquire the current time information from the timer 14, and then, reads the corresponding displayed data from the displaying storage unit 13 to supply the data to the display part 11 (FIG. 8B). The control part 1 is not operated at this time (FIG. 8C). When the display part 11 is in the non-display state, only operation of the switch 15 can perform time display. When the control part 1 is in the power conservation state, the above operation can be done. The battery consumption of the portable terminal device can be reduced.

Figure 9:
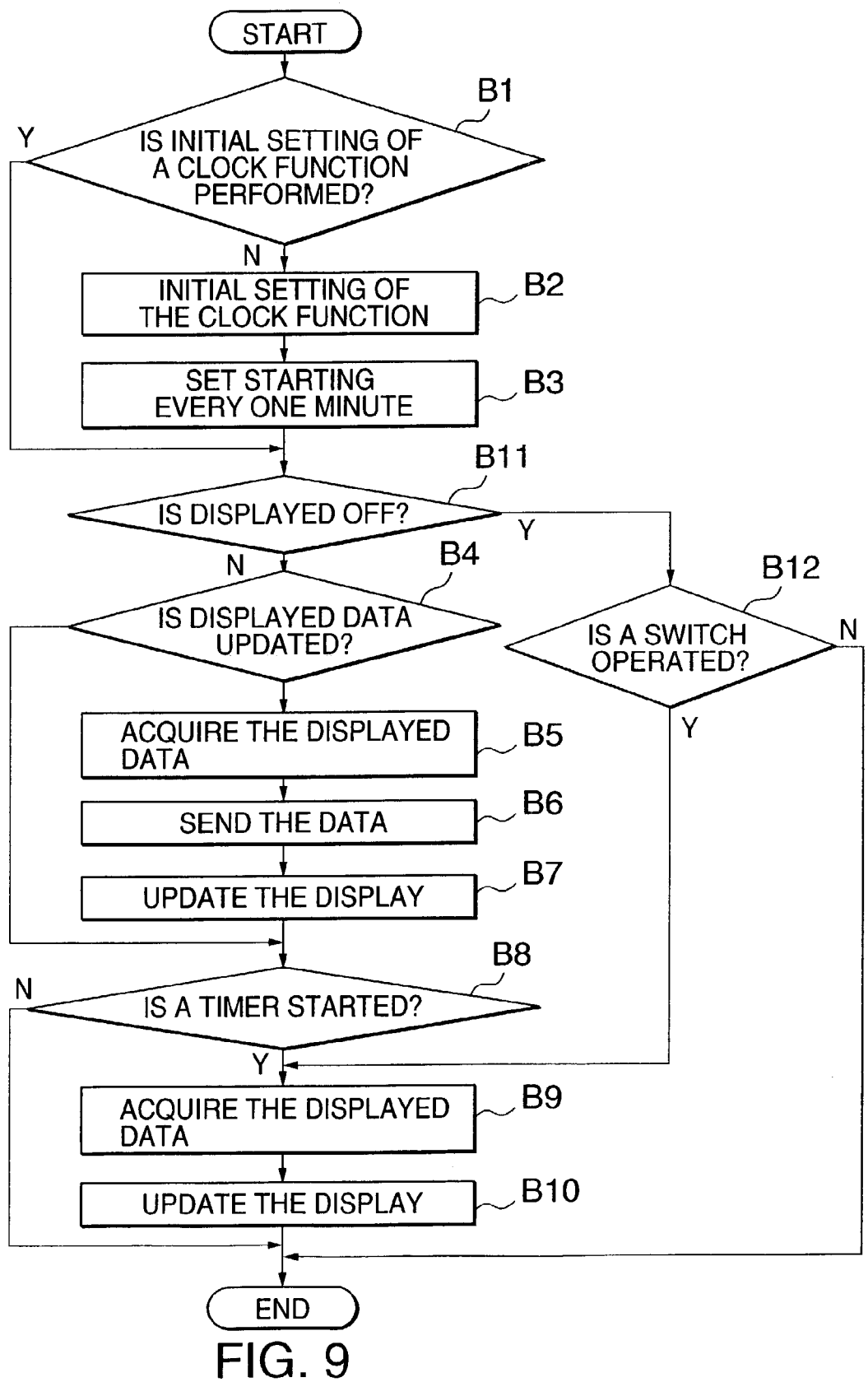
FIG. 9 is a flowchart showing an operation example of the portable terminal device of the present invention.

FIG. 9 is a flowchart of an example of the display operation of a portable terminal device having the switch 15. In steps B1 to B3, operation of the same initial setting as FIG. 6 is performed. In this example, the timer 14 is set to be started every one minute. After the initial setting, when the portable terminal device is brought to the standby state, whether the display part 11 is in the non-display state or not is judged (B11). When the display part 11 is in the display state, the control part 1 judges whether there is updated data to be sent or not (B4). The operation of steps B4 to B10 is the same as the operation of the steps A4 to A10. When the display part 11 is in the non-display state (B11), whether the switch is operated or not is judged (B12). When the switch 15 is operated, the displaying circuit 12 acquires the current time information from the timer and reads the displayed data corresponding to the current information from the displaying storage unit 13 (B9) to display the current time on the display part 11. When the switch 15 is not operated, the process is terminated. The initially set portable terminal device having the switch 15 repeatedly executes the operation of the steps B11 and B12 and the steps B4 to B10 in a period of short time.

In the portable terminal device having the switch 15, the user can bring the display part 11 to the non-display state (power conservation state). Operation of the switch 15 can perform time display without operating the control part 1. When the control part 1 is in the power conservation state, the same time display can be done.

Figure 10:
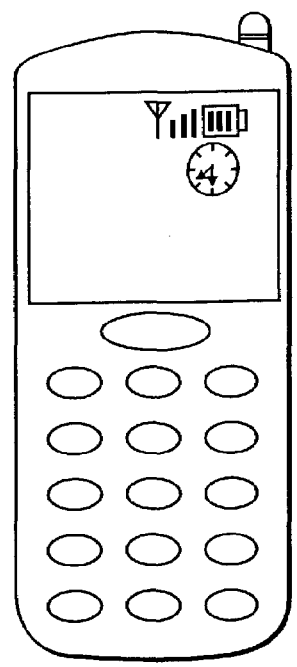
FIG. 10 is an appearance diagram of a specific example of the portable terminal device of the present invention.
Figure 11:
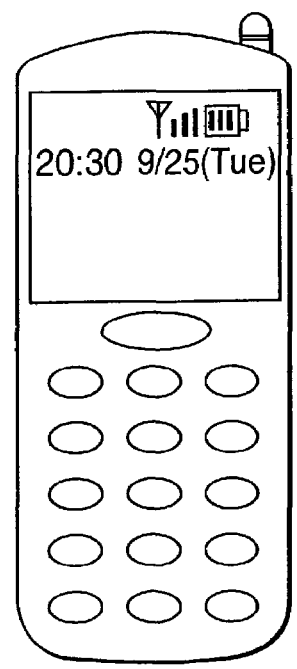
FIG. 11 is an appearance diagram of another specific example of a portable terminal device of the present invention.

Referring to FIG. 10, a portable terminal device of a specific example of the present invention is of a straight type and displays time information shown in an analog form and other information on one display part. Referring to FIG. 11, a portable terminal device is of a straight type and displays time information shown in a digital form and other information on one display part.

Figure 12:
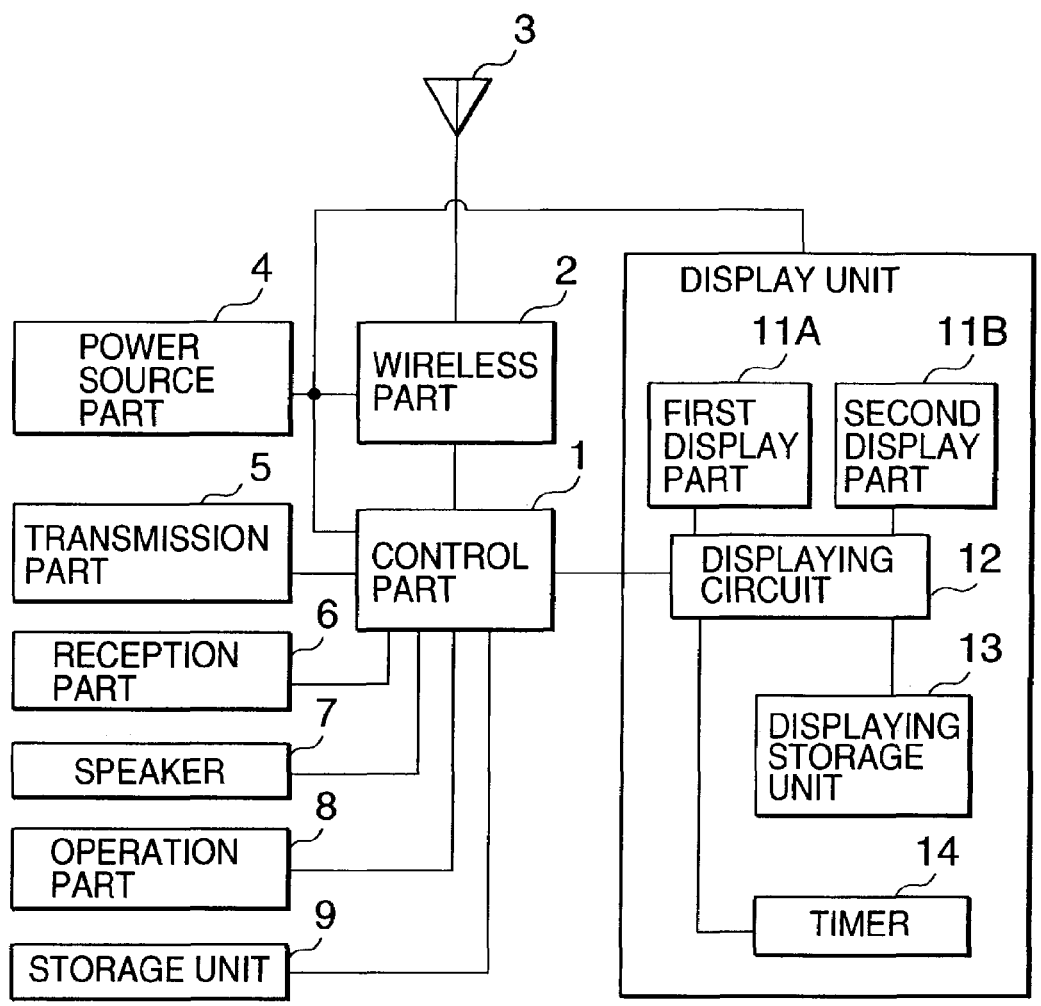
FIG. 12 is a block diagram showing a specific example of a portable terminal device having two display parts of the present invention.
Figure 13:
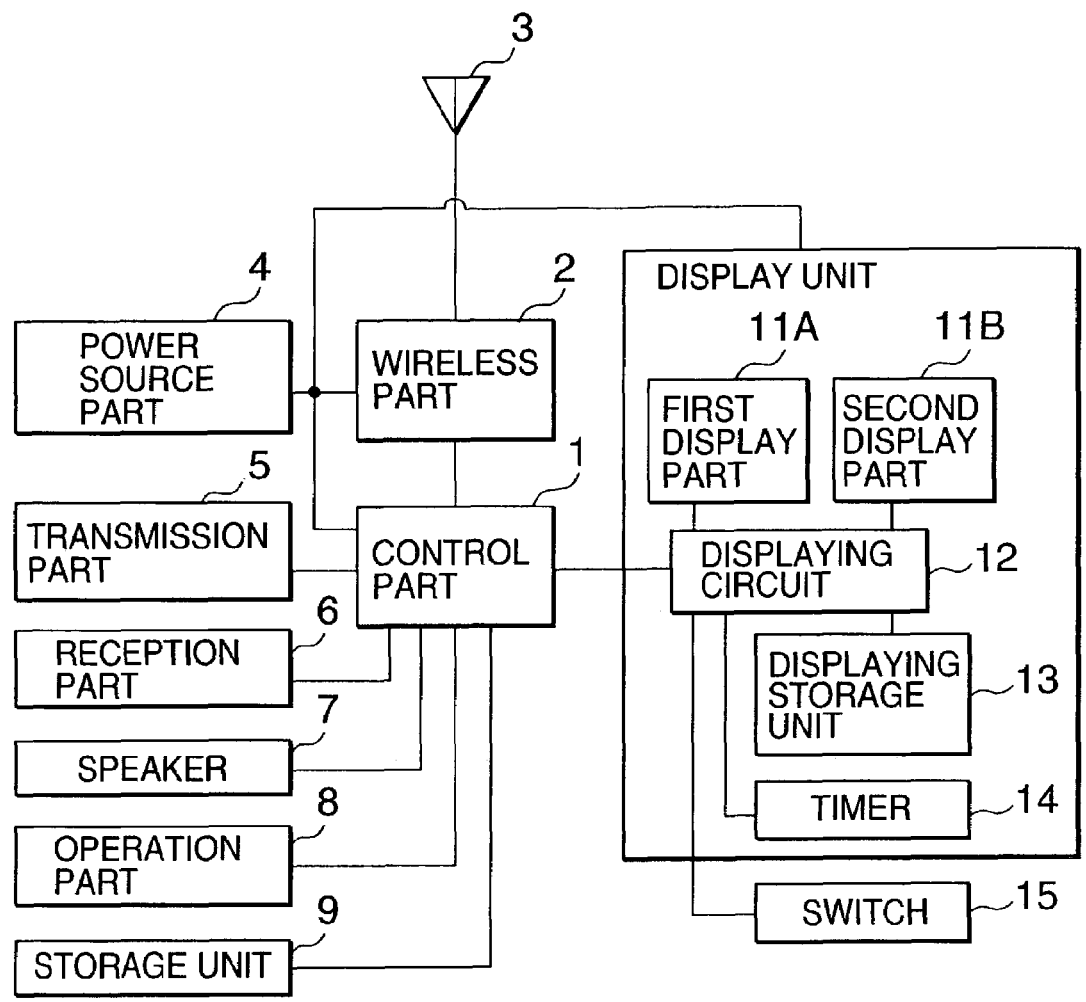
FIG. 13 is a block diagram showing another specific example of a portable terminal device having two display parts of the present invention.

Referring to FIGS. 12 and 13, in a portable terminal device of another specific example of the present invention, the display part has a first display part 11A and a second display part 11B. The displaying circuit 12 can display time on one of the display parts and the amount of battery remaining and reception level other than the time on the other display part.

Figure 14:
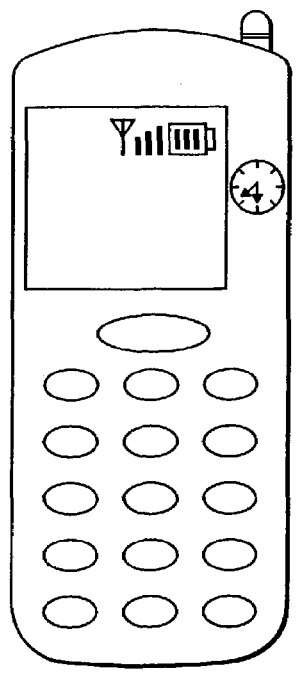
FIG. 14 is an appearance diagram of another specific example of a portable terminal device of the present invention.
Figure 15:
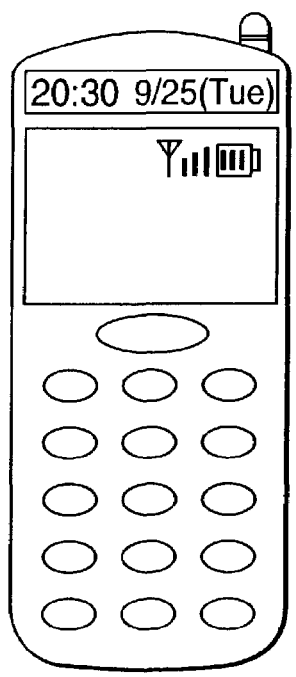
FIG. 15 is an appearance diagram of another specific example of a portable terminal device of the present invention.

FIG. 14 shows a specific example of a straight type portable terminal device having, on its face, the first display part and the second display part. The first display part displays the amount of battery remaining and reception level and the second display part displays time in an analog form. FIG. 15 shows another specific example of a straight type portable terminal device having, on its face, the first display part and the second display part. The first display part displays the amount of battery remaining and reception level and the second display part displays time in a digital form.

Figure 16A:
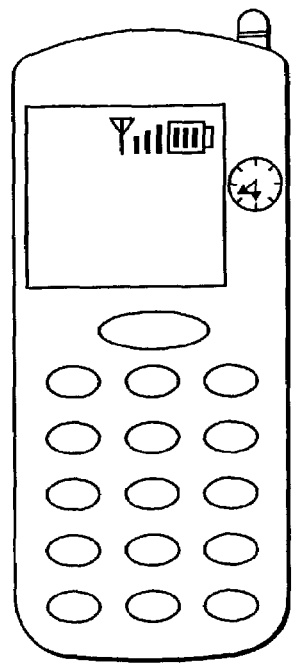
FIGS. 16A, 16B show an appearance diagram of another specific example of a portable terminal device of the present invention.
Figure 16B:
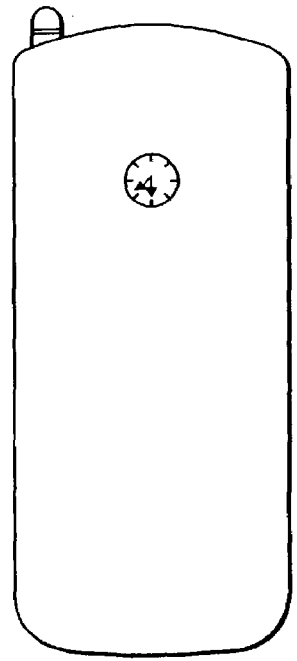
Figure 17A:
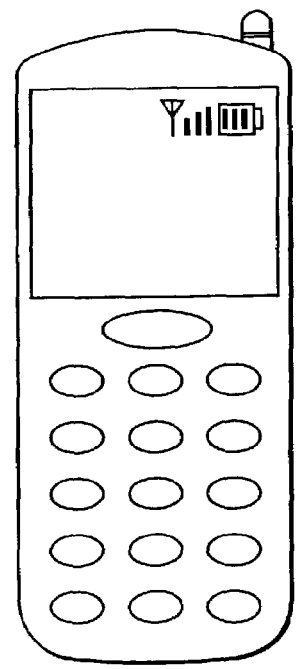
FIGS. 17A, 17B show an appearance diagram of another specific example of a portable terminal device of the present invention.
Figure 17B:
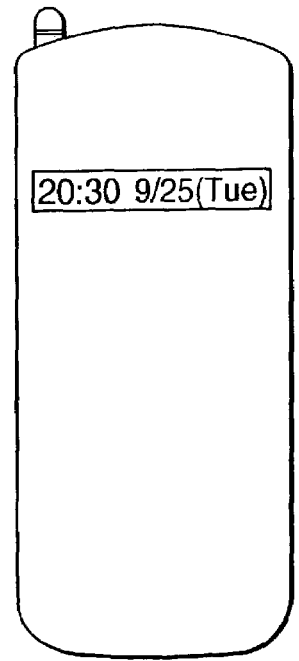

FIGS. 16A, 16B show another specific example of a straight type portable terminal device having, on its face, the first display part and on its back, the second display part. The first display part displays the amount of battery remaining and reception level and the second display part displays time in an analog form. FIGS. 17A, 17B show another specific example of a straight type portable terminal device having, on its face, the first display part and on its back, the second display part. The first display part displays the amount of battery remaining and reception level and the second display part displays time in a digital form.

Figure 18:
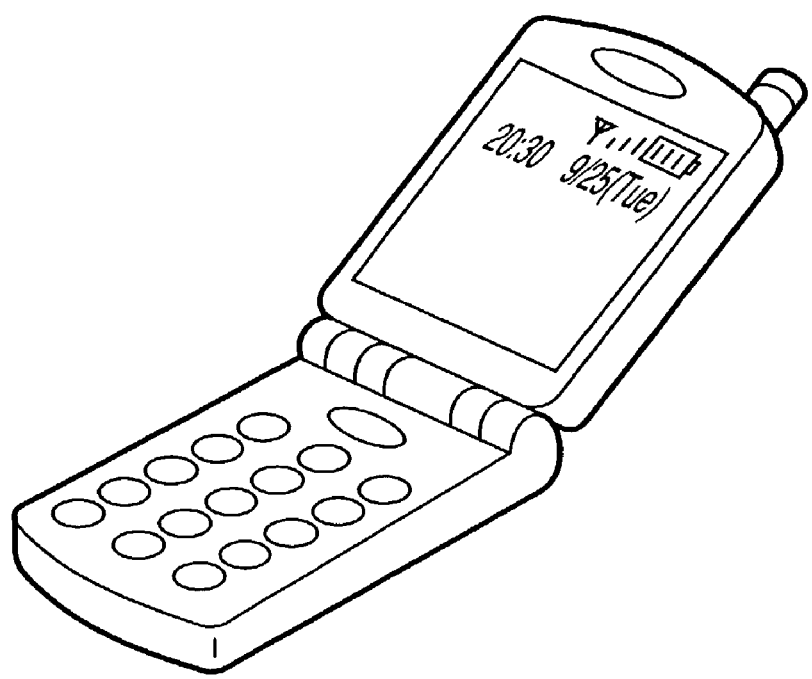
FIG. 18 is an appearance diagram of another specific example of a portable terminal device of the present invention.
Figure 19:
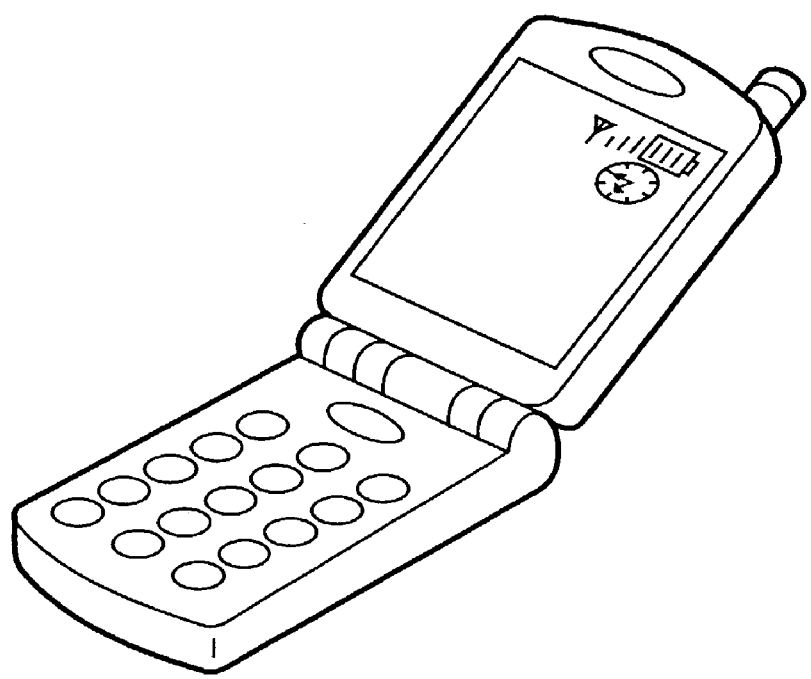
FIG. 19 is an appearance diagram of another specific example of a portable terminal device of the present invention.

FIG. 18 shows a fold type portable terminal device having a display part housing and an operation part housing. The display part housing has, on its face, a display part. The display part displays information such as time in an analog form, the amount of battery remaining and reception level. FIG. 19 shows a fold type portable terminal device having a display part housing and an operation part housing. The display part housing has, on its face, a display part. The display part displays in-formation such as time in a digital form, the amount of battery remaining and reception level.

Figure 20:
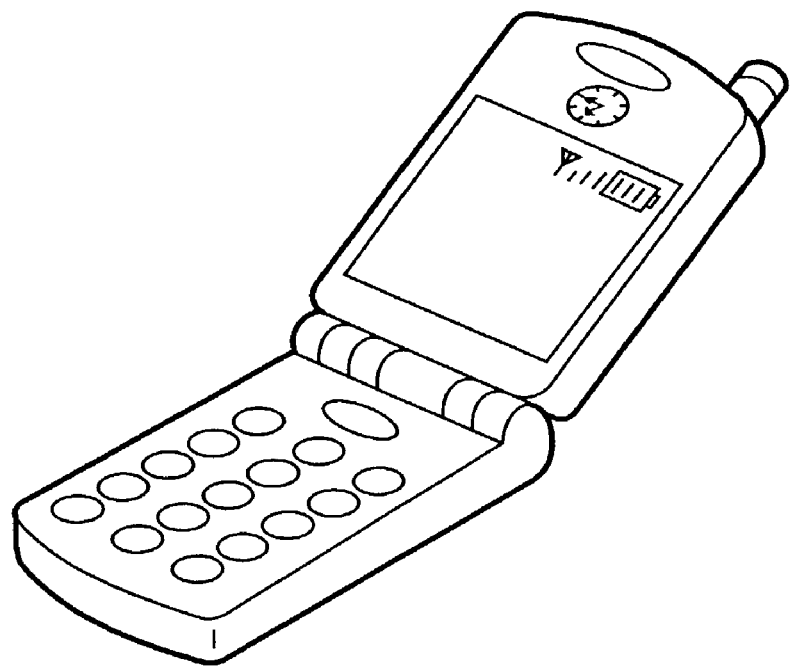
FIG. 20 is an appearance diagram of another specific example of a portable terminal device of the present invention.
Figure 21:
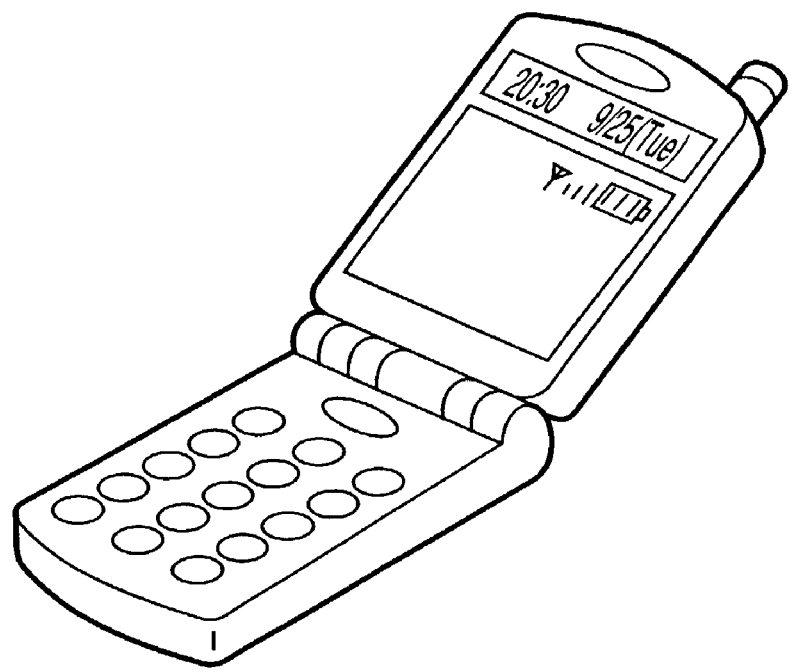
FIG. 21 is an appearance diagram of another specific example of a portable terminal device of the present invention.

FIGS. 20 and 21 show a specific example of a fold type portable terminal device, having on its face, the first display part and the second display part. The first display part displays the amount of battery remaining and reception level. In the terminal shown in FIG. 20, the second display part displays time in an analog form. In the terminal shown in FIG. 21, the second display part displays time in a digital form.

Figures 22A, 22B:
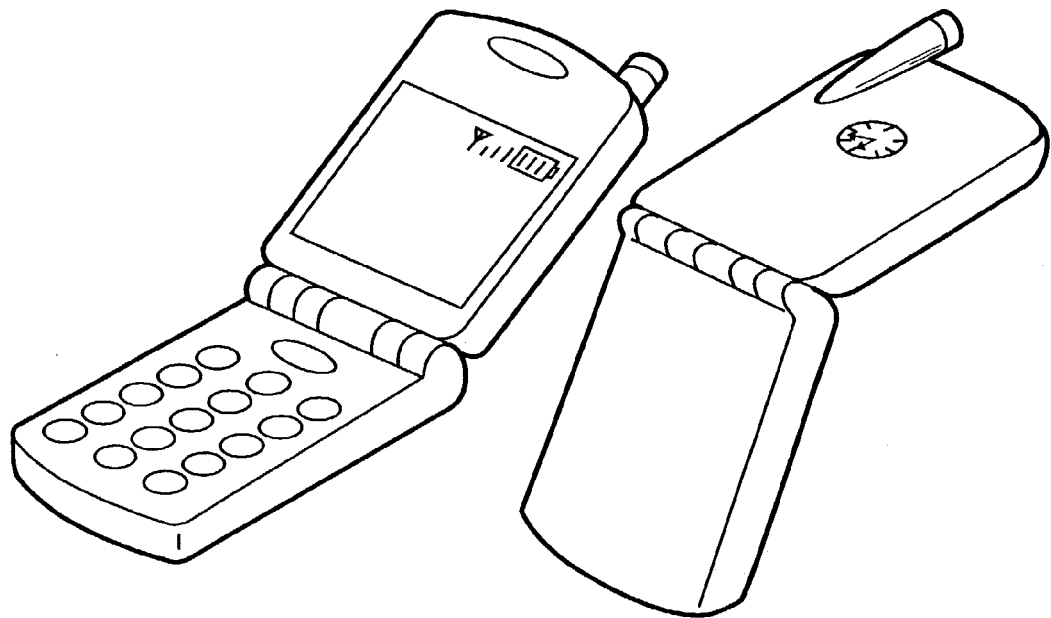
FIGS. 22A and 22B show an appearance diagram of another specific example of a portable terminal device of the present invention.
Figures 23A, 23B:
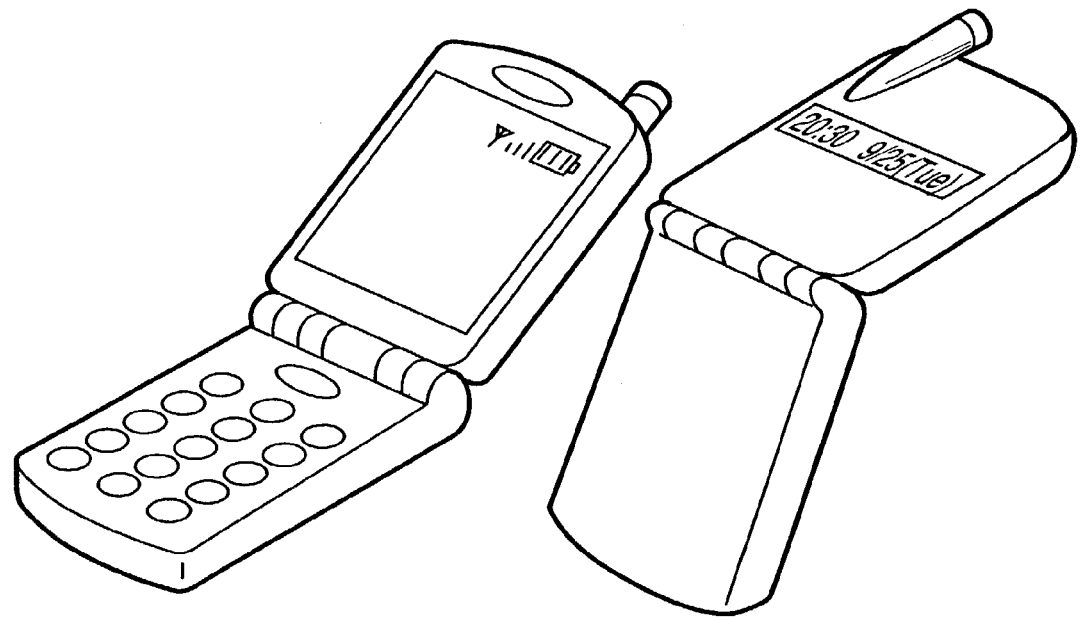
FIGS. 23A and 23B show an appearance diagram of another specific example of a portable terminal device of the present invention.

FIGS. 22A and 22B show a specific example of a fold type portable terminal device having a display part housing and an operation part housing. The display part housing has, on its face, the first display part displaying information such as the amount of battery remaining and reception level. The display part housing has, on its back, the second display part displaying time in an analog form. FIGS. 23A and 23B show a specific example of a fold type portable terminal device having a display part housing and an operation part housing. The display part housing has, on its face, the first display part displaying information such as the amount of battery remaining and reception level. The display part housing has, on its back, the second display part displaying time in a digital form.

Figures 24A, 24B:
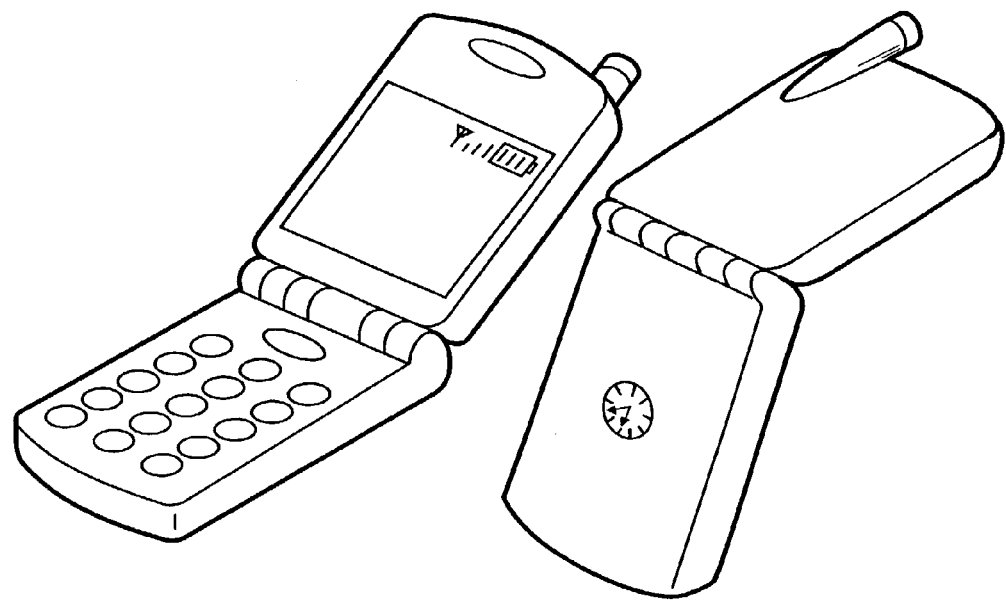
FIGS. 24A and 24B show an appearance diagram of another specific example of a portable terminal device of the present invention.
Figures 25A, 25B:
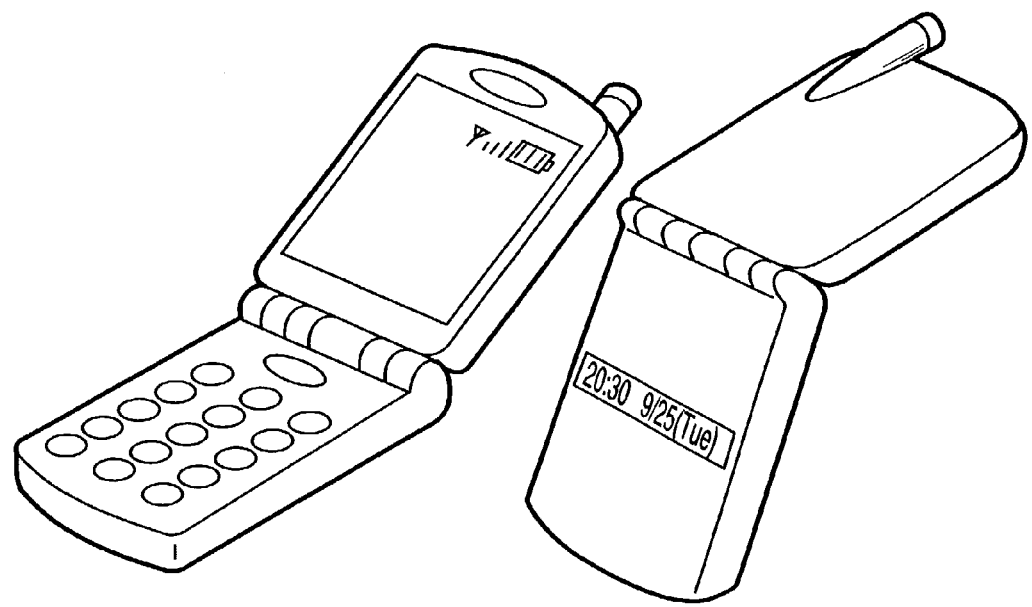
FIGS. 25A and 25B show an appearance diagram of another specific example of a portable terminal device of the present invention.
Figure 30D:
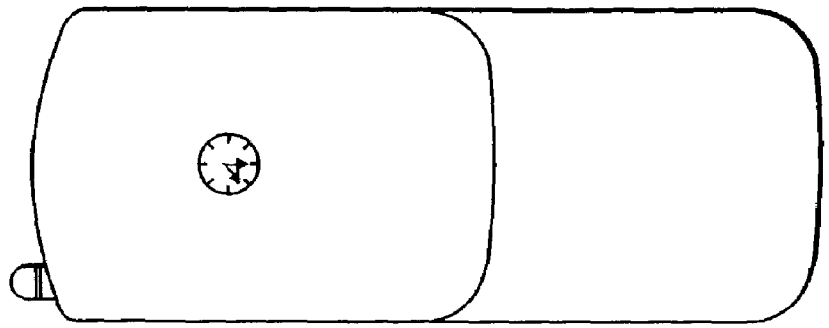
FIGS. 30A, 30B, 30C and 30D show an appearance diagram of another specific example of a portable terminal device of the present invention.
Figure 30C:
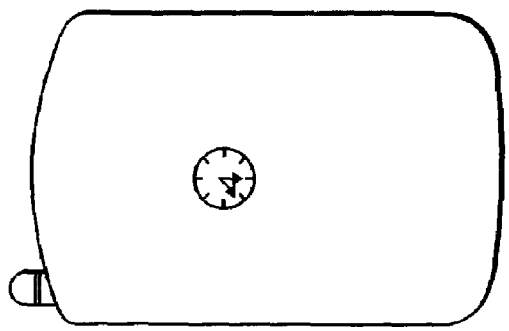
Figure 30B:
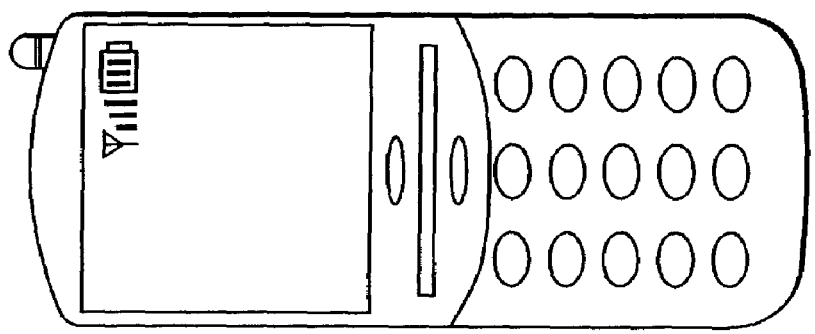
Figure 30A:
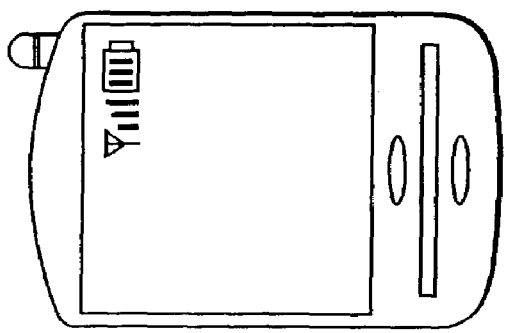
Figure 32A:
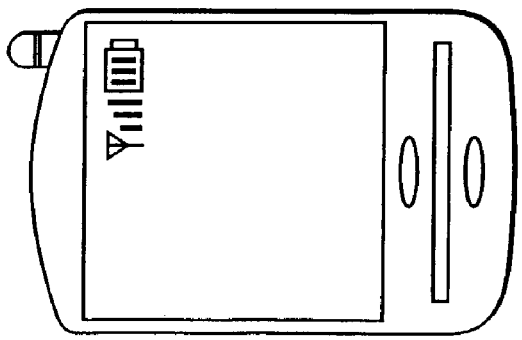
FIGS. 32A, 32B, 32C and 32D show an appearance diagram of another specific example of a portable terminal device of the present invention.
Figure 32B:
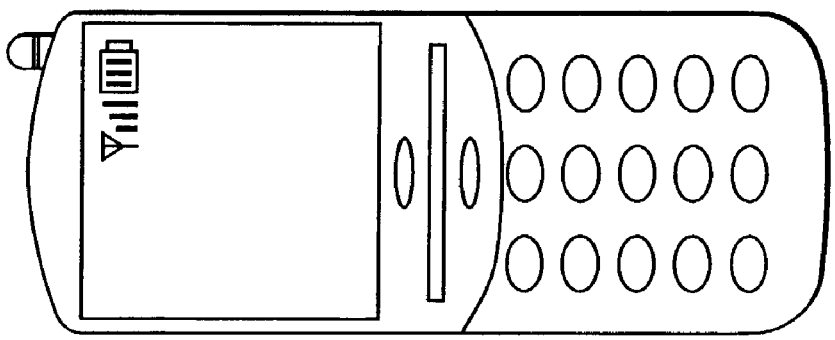
Figure 32C:
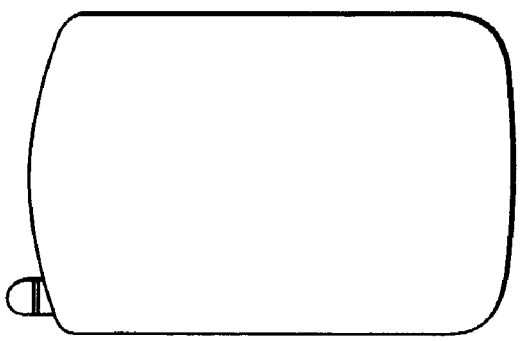
Figure 32D:
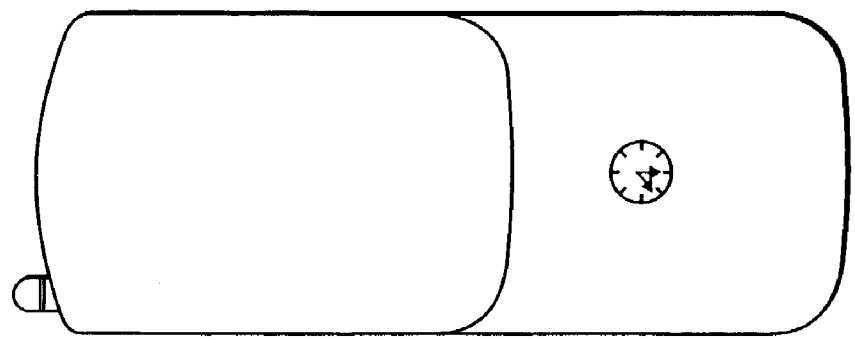
Figure 33D:
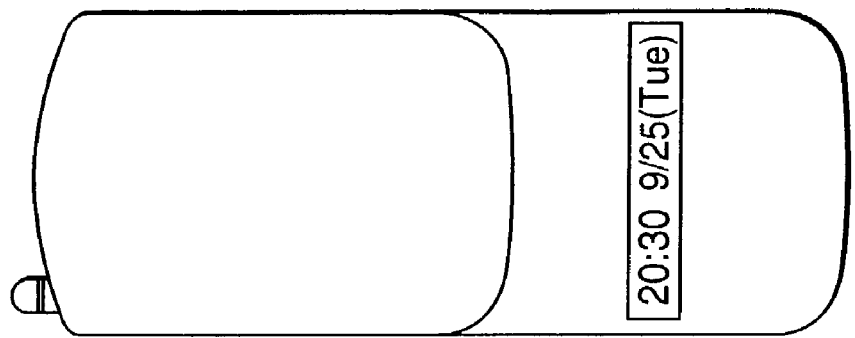
FIGS. 33A, 33B, 33C and 33D show an appearance diagram of another specific example of a portable terminal device of the present invention.
Figure 33C:
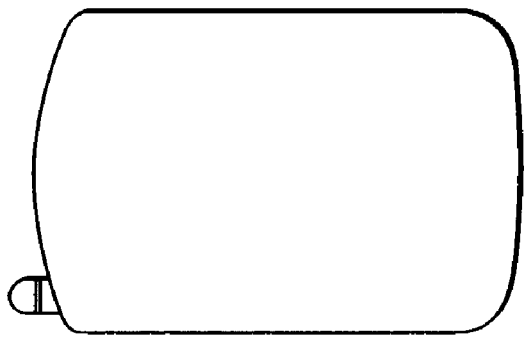
Figure 33B:
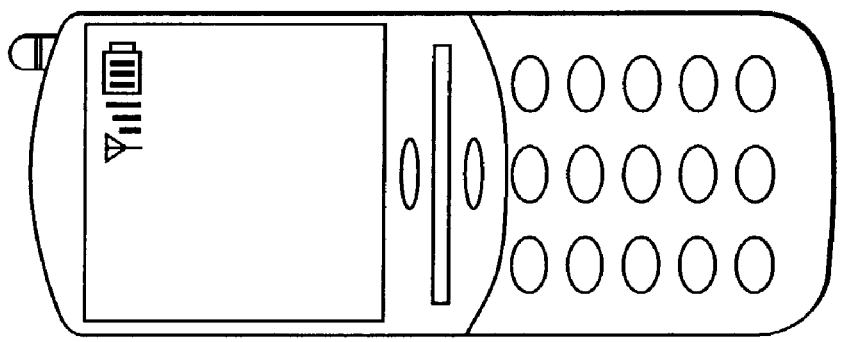
Figure 33A:
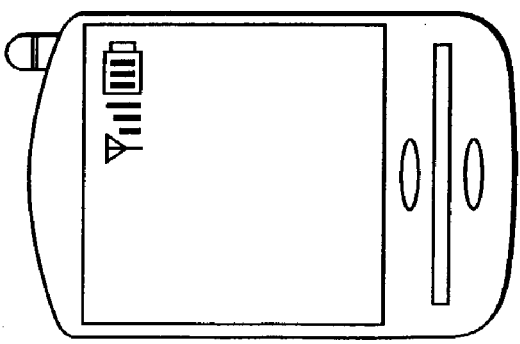

FIGS. 24A and 24B show another specific example of a fold type portable terminal device having a display part housing and an operation part housing. The display part housing has, on its face, the first display part displaying information such as the amount of battery remaining and reception level. The operation part housing has, on its back, the second display part displaying time in an analog form. FIGS. 25A and 25B show another specific example of a fold type portable terminal device having a display part housing and an operation part housing. The display part housing has, on its face, the first display part displaying information such as the amount of battery remaining and reception level. The operation part housing has, on its back, the second display part displaying time in a digital form.

FIGS. 26A and 26B show a specific example of a slide type portable terminal device having a display part housing and an operation part housing. The terminal has, on the face of the display part housing, a display part displaying time in an analog form, the amount of battery remaining and reception level. FIGS. 27A and 27B show a specific example of a slide type portable terminal device having a display part housing and an operation part housing. The terminal has, on the face of the display part housing, a display part displaying time in a digital form, the amount of battery remaining and reception level.

FIGS. 28A and 28B show another specific example of a slide type portable terminal device having a display part housing and an operation part housing. The first display part and the second display part are arranged on the face of the display part housing. The first display part displays the amount of battery remaining and reception level. The second display part displays time in an analog form. FIGS. 29A and 29B show another specific example of a slide type portable terminal device having a display part housing and an operation part housing. The first display part and the second display part are arranged on the face of the display part housing. The first display part displays the amount of battery remaining and reception level. The second display part displays time in a digital form.

FIGS. 30A, 30B, 30C and 30D show another specific example of a slide type portable terminal device having a display part housing and an operation part housing. The face of the display part housing has the first display part displaying the amount of battery remaining and reception level. The back of the display part housing has the second display part displaying time in an analog form. FIGS. 31A, 31B, 31C and 31D show another specific example of a slide type portable terminal device having a display part housing and an operation part housing. The face of the display part housing has the first display part displaying the amount of battery remaining and reception level. The back of the display part housing has the second display part displaying time in a digital form.

FIGS. 32A, 32B, 32C and 32D show a further specific example of a slide type portable terminal device having a display part housing and an operation part housing. The face of the display part housing has the first display part displaying the amount of battery remaining and reception level. The back of the operation part housing has the second display part displaying time in an analog form. FIGS. 33A, 33B, 33C and 33D show a further specific example of a slide type portable terminal device having a display part housing and an operation part housing. The face of the display part housing has the first display part displaying the amount of battery remaining and reception level. The back of the operation part housing has the second display part displaying time in a digital form.

The portable terminal device of the present invention can display time on the display part without starting the control part. It can also display time on the display part when the terminal is in the power conservation state. The portable terminal device can reduce battery consumption.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A portable terminal device including a timer, comprising:
    a display part displaying information;
    a timer measuring time;
    a storage part storing information displayed on said display part; and
    a displaying circuit directly detecting a signal from said timer and displaying a time on said display part based on the signal which is directly detected from said timer and without receiving a signal from a control part;
    the control part controlling display of information showing a current state of the portable terminal device, and
    wherein the portable terminal device includes a hand-held portable terminal device.

2. The portable terminal device according to claim 1, wherein a power source part of said portable terminal device directly supplies power to said display part, timer, storage part and displaying circuit.

3. The portable terminal device according to claim 1, wherein the control part of said portable terminal device can be changed into a power conservation mode.

4. The portable terminal device according to claim 3, wherein said displaying circuit displays the time on the display part when said control part is in the power conservation mode.

5. The portable terminal device according to claim 1, wherein said display part can be changed into a non-display state.

6. The portable terminal device according to claim 5, wherein said display part stops displaying updated information in the non-display state.

7. The portable terminal device according to claim 5, further comprising a switch part displaying information on the display part when the display part is in the non-display state.

8. The portable terminal device according to claim 7, wherein said information includes at least updated time.

9. The portable terminal device according to claim 1, wherein said display part includes a first display part displaying information showing the current state of the portable terminal device and a second display part displaying time.

10. The portable terminal device according to claim 1, wherein said information showing the current state of the portable terminal device includes at least one of an amount of battery remaining and reception level.

11. The portable terminal device according to claim 9, wherein
    the portable terminal device comprises a straight type portable terminal device, and
    the second display part is arranged on a same surface as the first display part.

12. The portable terminal device according to claim 9, wherein
    the portable terminal device comprises a straight type portable terminal device,
    the second display part is arranged on a surface opposite a surface on which the first display part is arranged.

13. The portable terminal device according to claim 9, wherein
    the portable terminal device comprises a fold type portable terminal device including an operation part housing and a display part housing, and the first and second display parts are arranged on the face of the display part housing.

14. The portable terminal device according to claim 9, wherein
the portable terminal device comprises a fold type portable terminal device including an operation part housing and a display part housing,
the first display part is arranged on the face of the display part housing and the second display part is arranged on the back of the display part housing.

15. The portable terminal device according to claim 9, wherein
the portable terminal device comprises a fold type portable terminal device including an operation part housing and a display part housing, and
the first display part is arranged on the face of the display part housing and the second display part is arranged on the back of the operation part housing.

16. The portable terminal device according to claim 9, wherein
the portable terminal device comprises a slide type portable terminal device including an operation part housing and a display part housing, and
the first and second display parts are arranged on the face of the display part housing.

17. The portable terminal device according to claim 9, wherein
the portable terminal device comprises a slide type portable terminal device including an operation part housing and a display part housing, and
the first display part is arranged on the face of the display part housing and the second display part is arranged on the back of the display part housing.

18. The portable terminal device according to claim 9, wherein
the portable terminal device comprises a slide type portable terminal device including an operation part housing and a display part housing, and
the first display part is arranged on the face of the display part housing and the second display part is arranged on the back of the operation part housing.

19. The portable terminal device according to claim 1, wherein the portable terminal device includes at least one of a portable telephone and a battery-powered portable terminal device.

20. The portable terminal device according to claim 19, wherein the portable terminal device includes a plurality of display parts.

21. The portable terminal device according to claim 1, wherein the displaying circuit updates the time being displayed on the display part in a state where the control part has not been started up.

22. The portable terminal device according to claim 1, wherein said displaying circuit updates the time being displayed on the display part when said control part is in a power conservation mode.

23. The portable terminal device according to claim 1, wherein the displaying circuit updates the time being displayed on the display part based on the signal which is directly detected from the timer.

* * * * *